Oct. 30, 1934.  E. W. GALLOWAY  1,979,032
BRAKE TESTING APPARATUS
Filed Oct. 5, 1931  2 Sheets-Sheet 2
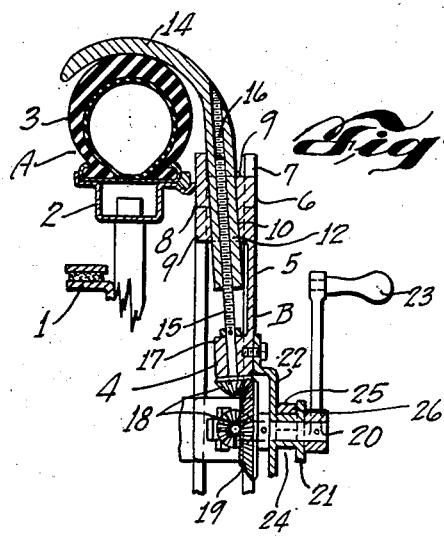
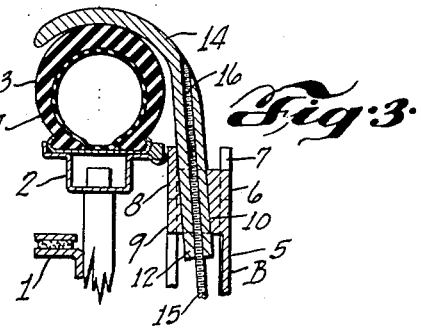
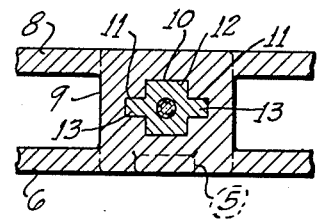
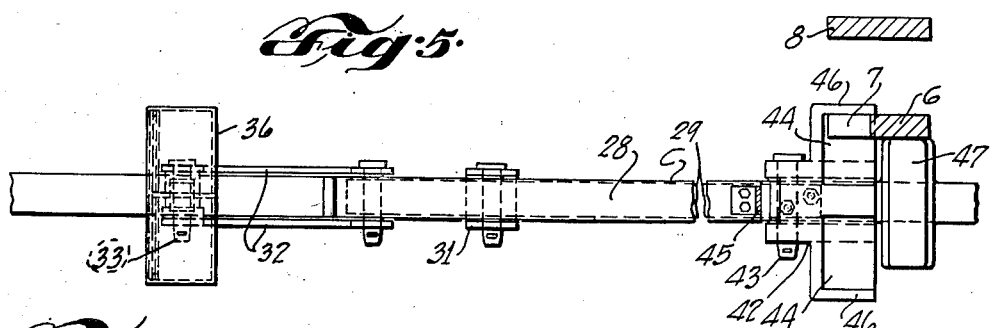
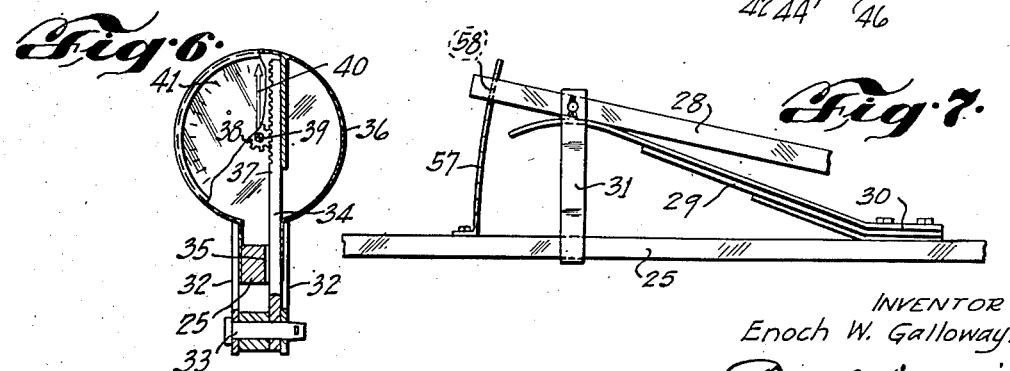
INVENTOR
Enoch W. Galloway.
ATTORNEY Patented Oct. 30, 1934

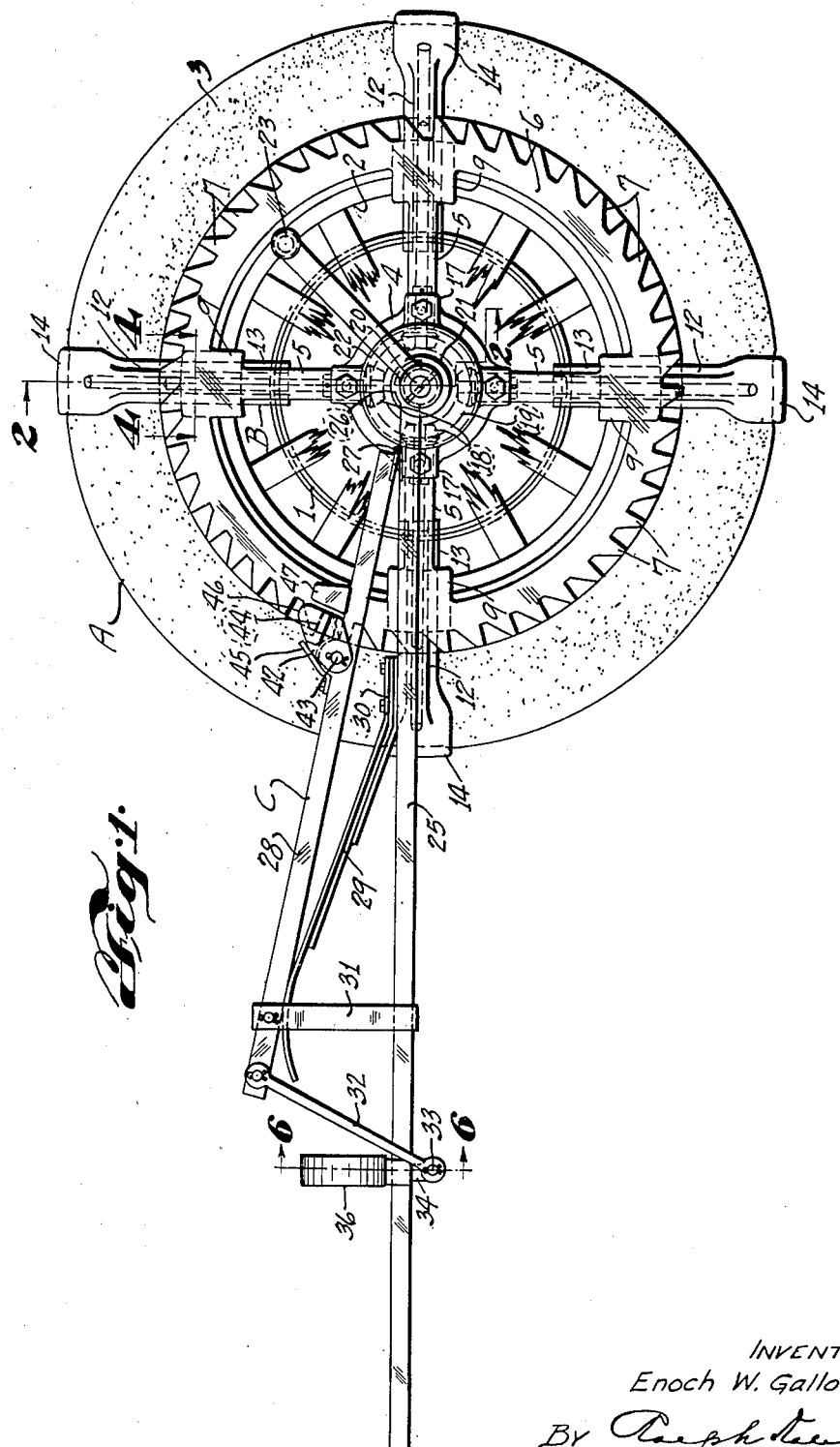

1,979,032

UNITED STATES PATENT OFFICE 1,979,032

BRAKE TESTING APPARATUS

Enoch W. Galloway, University City, Mo.

Application October 5, 1931, Serial No. 566,923

1 Claim. (Cl. 265—1)

This invention relates generally to brake-testing apparatus. More particularly, my invention has reference to an apparatus for testing the wheel-brakes of automotive vehicles.

My invention has for its prime object the provision of a portable apparatus for efficiently testing the wheel-brakes of automotive vehicles, which may with facility be employed without bodily moving the vehicle, and is adapted more especially, though not exclusively, for personal or home use by the owner of the vehicle.

My invention has for another object the provision of a wheel-brake testing apparatus readily mountable and demountable on a vehicle-wheel for testing its carried brake, the operation of testing the brake being conveniently and easily performed even by those previously unskilled in such work.

And with the above and other objects in view, my invention resides in the novel features of form, construction, arrangement, and combination of parts hereinafter described and pointed out in the claim.

In the accompanying drawings (two sheets),—

Figure 1 is a side-elevational view of a brake-testing apparatus of my invention, illustrated as applied to a brake-carrying vehicle-wheel;

Figure 2 is a half-vertical fragmentary sectional view through the apparatus and the vehicle-wheel, taken approximately along the line 2—2, Figure 1;

Figure 3 is a fragmentary sectional view similar to the upper portion of Figure 2, showing the position of a tire-clamp when engaging a larger-sized tire than that shown in Figure 2;

Figure 4 is a fragmentary sectional view through one of the guide-blocks of the wheel-supported frame, taken approximately along the line 4—4, Figure 1;

Figure 5 is a fragmentary top-plan view, partly in section, of the torque-applying apparatus, portions of the frame-flanges or rings being shown and other parts broken away;

Figure 6 is a sectional view, partly in elevation, of the scale-indicating device, taken approximately along the line 6—6, Figure 1; and Figure 7 is a fragmentary side sectional view of a portion of the apparatus illustrated in Figure 1, showing a modified form of scale-indicating apparatus, other parts being omitted.

Referring now more in detail and by reference characters to the drawings, which illustrate a preferred embodiment of my invention, A designates a conventional type of automotive-vehicle wheel, which includes a braking-apparatus generally indicated at 1, a tire-carrying rim 2, and a tire 3, as will be readily understood by those skilled in the art.

B designates a portable frame adapted for mounting approximately flatwise upon a side of the wheel A and includes a central annular hub or ring 4 having a plurality of equally spaced radially projecting arms 5, preferably four in number, which at their respective outer ends are integrally connected to a ratchet wheel or ring 6 of greater radial depth than lateral thickness, the ring 6 being peripherally provided with a circumferential series of ratchet teeth 7 for purposes presently appearing.

Axially aligned with and spaced from, and preferably of the same diametrical dimensions as, the ring 6, is a second or rear annular flange or ring 8 devoid, however, of teeth, the ring 8 being adapted for flatwise engaging preferably a side margin of the rim 2 of the wheel A and being integrally connected with the ring 6 by means of a plurality of guide- or filler-blocks 9, preferably also four in number, each forming a lateral extension of a respective arm 5.

Suitably provided radially in the respective guide-blocks 9, are ways 10, each of which preferably includes laterally offset opposed way-communicating channels 11, best seen in Figure 4, the ways 10 being obliquely disposed radially-rearwardly towards the tire 3 in the axial plane of the frame B, as shown in Figure 2.

Shiftable in the ways 10, are respective plungers 12, each having a pair of laterally opposite wings or shoes 13 slidably engaging the corresponding way-channels 11, and extending from the respective outer ends of the plungers 12, are rearwardly curved tire gripping members or hooks 14 adapted for clamping crosswise engagement upon and with the periphery or tread of the tire 3, for which purpose the hooks 14 are made relatively wide as shown and preferably merge laterally into the plunger-wings 13.

It may be here stated, however, that usually the width of the rim 2 increases with increase of the outer diameter of the tire 3; hence the inclination of the ways 10 in tire-sloping direction is selected in such manner that, on obliquely-outward shifting movement of the plungers 12 for engaging the hooks 14 with tires of larger and larger diameter, each of the hooks 14 will be also shifted bodily more or less across the tire-section in order that the bight of the hook may approximately be centered on the tread of the tire, as and when the frame-flange or ring 8 engages the rim 2 as best seen in Figures 2 and 3.

For such frame-mounting engagement of the hooks 14 with the tire 3, the plungers 12 are shiftably mounted on elongated threaded shafts or screws 15 radially disposed in the frame B and preferably opposite the respective arms 5 thereof, the screws 15 working in complementarily threaded bores 16 provided in the plungers 12. At their respective inner ends, the screws 15 are suitably mounted for rotation in corresponding bearings 17 provided on the hub-ring 4, and are provided with pinions 18, which have common meshing engagement with a driving-member or bevel-gear 19 mounted on an actuating shaft 20 disposed in the axis of the frame B and arranged for rotation in a bearing 21 projecting forwardly from a cap 22 detachably supported by and on the hub-ring 4, the shaft 20 at its outer end carrying a handled crank 23 and being intermediately provided with a circumferential way or groove 24 for a purpose soon appearing.

Adapted for demountable co-operation with the frame B, is a variable torque-applying means C, which includes an elongated lever or bar 25 extending radially from the frame B and provided at its inner end with a downwardly curved hook 26 adapted for disposition detachably in the groove 24 for fulcruming the lever 25 on the hub or bearing 21 of the frame B, as best seen in Figure 1.

Hinged, as at 27, to, and upon the upper side of, the inner end of the lever 25, is an abutment-arm 28, whose outer end-portion is normally resiliently supported on, and has pressure-responsive yieldable connection with, the lever 25 by means of an interposed resilient member or spring 29, which preferably is of the quarter-elliptic type, as shown, and fixed, as at 30, on the lever 25 for extending rearwardly upwardly between the lever 25 and the arm 28 for engaging the underside of the latter for biasing the lever 25 in spaced relation with the arm 28.

Pivotally depending from the arm 28 for embracing the lever 25, is a stirrup 31 adapted at its bight for engaging the underside of the lever 25 for limiting the swingable spring-influenced movement of the lever 25 relatively to the arm 28.

From the respective sides of the free outer end of the arm 28, depend pivotally supported links 32, which at their respective lower ends extend below the lever 25 for pivotal connection with a transverse pin 33, on which is intermediately mounted an upstanding plunger 34 working in a slot 35 provided in the lever 25 for shiftable movement in a scale-case or housing 36 supported and fixed on the lever 25. The plunger 34 is provided with a series of rack-teeth 37 meshing with a pinion 38 mounted on a pointer-shaft 39 rotatively mounted in the housing 36 and carrying a pointer 40 having scale-indicating co-operation with a dial 41 supported also by the housing 36, as best seen in Figure 6.

A pawl 42, having spaced ears pivotally engaging the opposite ends of a pin 43 mounted in and through the arm 28 intermediate the ends thereof, is provided with a pair of laterally offset or oppositely projecting bills 44, either one or the other of which is aligned for co-operative latching engagement with the peripheral series of teeth 7 on the frame-ring 6 according to the side of the vehicle at which the apparatus is employed, as will presently appear, the pawl 42 being influenced for frame-tooth-engagement by a suitable spring 45 mounted on the arm 28.

For resisting the overturning movement of the offset pawl-bills 44 on the arm 28, each of the bills 44 is provided with an upstanding ear 46 adapted for engaging the rear face of the frame ring or flange 6, and mounted on the arm 28, is an upstanding laterally expanded shoe 47 adapted for bearing one or the other of its side faces upon the front face of the ring 6, as best seen in Figure 5.

Hence in use and operation of the apparatus, the brakes of the vehicle having been initially set a suitable brake-pedal depressing device, the particular wheel A carrying the brake to be tested is suitably jacked-up, the frame B is disposed flatwise against a side of the wheel A with the frame-flange or ring 8 residing preferably against the side of the wheel-rim 2, and the crank 23 suitably manipulated for drawing the hooks 14 equally upon the tire 3, thus automatically centering the frame B securely and accurately upon the wheel A.

I may here state that the particular embodiment of the apparatus shown in the drawings is applicable for use preferably on the wheels on the right-hand side of the vehicle only, for the reason that, since the main braking effort is exerted on forward movement of the vehicle, in testing the brakes the wheel should be turned in forward direction; hence the ratchet-teeth 7 are inclined or turned, so-to-speak, oppositely to the forward rotation of the wheel, and it follows that, for working on the left-hand side of the vehicle, the teeth 7 should be opposite-hand to those shown.

Such result may be most conveniently accomplished by constructing a pair of the frames B, one having the teeth 7 arranged as shown, and the other having the teeth 7 arranged oppositely to those shown, all other parts having form and function similar to those herein described.

A proper form of the frame B being thus mounted on the wheel A, the torque-applying mechanism C is mounted as described upon the frame B for extending in vehicle-rearward direction therefrom, with the pawl 42 in latching engagement with the frame-teeth 7, as clearly shown in Figure 1.

The torque-lever 25 is then, by manual or other suitable means, lifted or rotated upwardly on the hub 21. The arm 28, however, being latched by means of the pawl 42 with and to the frame B, provides, as may be said, an abutment for the spring 29, which latter yields with increasing resistance to the brake-testing torque applied on rotatory movement of the lever 25, and as the spring 29 yields to increasing torque-applying pressure of the lever 25, the latter rises toward the arm 28 and the links 32 correspondingly depress the plunger 34 for actuating the pointer 40 for indicating on the dial 41 the brake-testing pressure of the lever 25, the dial-indications preferably being expressed in pounds.

When the brake-testing pressure of the lever 25 is sufficient for overcoming the resistance of the braking mechanism 1, there ensues a simultaneous movement of the torque apparatus C, frame B, and wheel A, at which time the indication of the pointer 40 on the dial 41 is read, which indication will be responsive, in part, to the initial setting of the brakes, and in other part to the adjustment of the brake being tested, as will be understood. The dial reading being suitably noted, the brake-testing operation on that particular wheel A is completed.

If similarly performed tests on the other brake-carrying wheels of the vehicle yield concordant results, the brakes may be considered equalized, otherwise adjustments may be made and the tests repeated until the desired results are obtained, care being taken to maintain the brake-setting device in consistent brake-setting cooperation with the brake-pedal until the brakes have all been tested and equalized.

Time may be saved if the opposite-hand frame is applied to a wheel on the side of the automobile opposite to the wheel being tested, so that, when the latter test is completed, the torque-lever 25 and its carried apparatus may with ease and facility be dismounted from the frame on the tested wheel and carried to and mounted, in turn, on the frame previously attached to the wheel on the opposite side of the vehicle.

The apparatus is relatively simple in structure, may be inexpensively manufactured, and is exceedingly efficient in the performance of its intended functions.

Figure 7 illustrates a modified form of pressure-indicating means, which comprises an arcuate scale-member 57 upstandingly mounted on the lever 25 for working in and through a slot 58 provided in the end of the arm 28. During the use of the apparatus as heretofore set forth, the ascent of the scale 57 through the slot 58 in the arm 28 exposes the scale figures for indicating the pressure applied to the lever 25 against the yielding resistance of the spring 29.

And it will be understood that other changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is,—

In a wheel-brake testing apparatus, in combination, a frame for mounting on a side of the wheel, the frame including a hub, a first set of arms radiating from the hub, a pair of axially aligned block-connected rings fixed to the arms, a second set of arms adjustably supported by the blocks for frame-supporting engagement with the wheel, one of said rings being peripherally provided with a circumferential series of teeth and the other of said rings being flatwise engageable with a side margin of the rim of the wheel, a laterally projecting bearing supported by the hub, an elongated lever having an end hookwise fulcrumed on said bearing, a third arm hinged at an end to and upon the upper face of the lever in spaced relation to said bearing, a spring-pressed pawl on the third arm for engagement with the teeth, a spring interposed between the lever and the third arm for yieldingly spacing the third arm at its free end from the lever, the lever being shiftable toward said third arm for exerting pressure through the spring on said arm for effecting a brake-applying torque on the wheel, and means including a dial carried by the lever and a pointer cooperable with the dial having operative connection with the third arm for indicating the torque applied to the wheel.

ENOCH W. GALLOWAY.